(12) United States Patent
Lilakos et al.

(10) Patent No.: US 10,375,979 B2
(45) Date of Patent: Aug. 13, 2019

(54) APPARATUS, SYSTEM AND METHOD FOR CHILLING SAUCES AND LIQUIDS

(71) Applicant: LINDE AKTIENGESELLSCHAFT, Munich (DE)

(72) Inventors: Louis Lilakos, Ontario (CA); Scott Thomas Madsen, Burr Ridge, IL (US); Monica Ortiz-Cordova, Ontario (CA)

(73) Assignee: Linde Aktiengesellschaft, Munich (DE)

( * ) Notice: Subject to any disclaimer, the term of this patent is extended or adjusted under 35 U.S.C. 154(b) by 55 days.

(21) Appl. No.: 15/031,292

(22) PCT Filed: Oct. 5, 2015

(86) PCT No.: PCT/US2015/053979
§ 371 (c)(1),
(2) Date: Apr. 22, 2016

(87) PCT Pub. No.: WO2016/060869
PCT Pub. Date: Apr. 21, 2016

(65) Prior Publication Data
US 2016/0270433 A1 Sep. 22, 2016

Related U.S. Application Data

(60) Provisional application No. 62/065,183, filed on Oct. 17, 2014.

(51) Int. Cl.
*A23L 3/375* (2006.01)
*F25D 3/10* (2006.01)
*F25D 3/12* (2006.01)

(52) U.S. Cl.
CPC .............. *A23L 3/375* (2013.01); *F25D 3/10* (2013.01); *A23V 2002/00* (2013.01); *F25D 3/12* (2013.01)

(58) Field of Classification Search
CPC ....... A23L 3/375; A23V 2002/00; F25D 3/10; F25D 3/12
See application file for complete search history.

(56) References Cited

U.S. PATENT DOCUMENTS 3,214,928 A    11/1965  Oberdorfer
4,422,773 A  * 12/1983  Cassaday .............. B01F 5/0646
                                                        366/341

(Continued)

FOREIGN PATENT DOCUMENTS

EP    0 455 243 A2    11/1991
EP    2700454 A1      2/2014
EP    3009006 A1      4/2016

OTHER PUBLICATIONS

European Search Report for 15154935.9-1368, dated Jun. 17, 2015, 4 pages.

(Continued)

*Primary Examiner* — Tony G Soohoo
(74) *Attorney, Agent, or Firm* — Joshua L. Cohen

(57) ABSTRACT

An apparatus for treating a flowable food product includes a container constructed from a first plastic material; an injection chamber arranged within the container, and including an inlet and an outlet in fluid communication with the injection chamber; at least one nozzle constructed from a second plastic material, the at least one nozzle including a first end in fluid communication with a source of cryogen and a second end in fluid communication with the chamber for providing the cryogen to the chamber. A related system and method are also provided.

7 Claims, 3 Drawing Sheets

(56) References Cited

U.S. PATENT DOCUMENTS

| | | | | |
|---|---|---|---|---|
| 5,400,614 | A * | 3/1995 | Feola | A23G 9/163 366/102 |
| 5,715,685 | A | 2/1998 | Takasugi | |
| 6,000,229 | A * | 12/1999 | Jones | A23G 9/04 62/373 |
| 6,510,890 | B1 * | 1/2003 | Paskach | A23G 9/04 165/61 |
| 6,539,743 | B2 * | 4/2003 | Jones | A23G 9/04 198/495 |
| 7,263,842 | B2 | 9/2007 | Moeller et al. | |
| 7,316,122 | B1 * | 1/2008 | Jones | A23G 1/50 239/556 |
| 7,318,324 | B2 * | 1/2008 | Ulrich | A23G 9/04 366/144 |
| 7,754,266 | B2 * | 7/2010 | Waletzko | A23G 9/06 426/519 |
| 7,938,061 | B2 * | 5/2011 | Timmons | A23G 9/06 99/452 |
| 8,470,383 | B2 * | 6/2013 | Rasanayagam | A23B 4/09 426/327 |
| 8,691,308 | B2 * | 4/2014 | Braithwaite | A23B 4/08 426/274 |
| 9,138,697 | B2 * | 9/2015 | Hanada | B01F 5/0646 |
| 2006/0110515 | A1 * | 5/2006 | Waletzko | A23G 9/06 426/565 |
| 2006/0283195 | A1 | 12/2006 | Rosenbaum et al. | |
| 2010/0162732 | A1 | 7/2010 | Newman | |
| 2010/0255170 | A1 | 10/2010 | Lopez | |
| 2011/0064858 | A1 * | 3/2011 | Waletzko | A23G 9/06 426/519 |
| 2012/0171344 | A1 * | 7/2012 | Rasanayagam | A23B 4/09 426/524 |
| 2014/0000297 | A1 | 1/2014 | Wieland | |
| 2014/0166238 | A1 | 6/2014 | Sandu | |

OTHER PUBLICATIONS

International Search Report for PCT/US2015/053979, dated Dec. 23, 2015, Authorized Officer: Blaine R. Copenheaver, 3 pages.

Written Opinion for PCT/US2015/053979, dated Dec. 23, 2015, Authorized Officer: Blaine R. Copenheaver, 11 pages.

* cited by examiner

APPARATUS, SYSTEM AND METHOD FOR CHILLING SAUCES AND LIQUIDS

BACKGROUND

The present embodiments relate to apparatus and methods to reduce the temperature of liquids used in for example the food processing and preparation industries.

Rapid chilling of food products allows for greater production of same and greater flexibility to process high heat load input products of different types. In, for example, the meat processing industry, processors are usually limited to sixteen hour work days. Increased, more effective processing thereby eliminates weekend shifts, as the processor can now operate at full production during the week and/or reduce overtime.

Increased chill speed of the product reduces bacteria growth on the product; while product temperature, consistency, pull down rate and quality are all improved.

The food industry currently reduces the chill cycle time with known mechanical systems, including a freon/cold water/glycol jacketed vessel.

In order to chill liquid food products, such as pie fillings, pizza sauce, gravies and marinates, in the confection, bakery and meat industries, the food industry employs mechanical chilling systems and other methods such as a water-to-sauce heat exchanger to chill liquid products. In such methods, and using a liquid sauce for example, the sauce is drawn directly from a hot source (cooking/pasturization) and quickly cooled down through the 40° F. (4.4° C.) zone to control bacterial growth. The more quickly the liquid batch is cooled, the greater the output of product and/or the fewer cooling kettles/vats/vessels that are required during the cooling process.

Most known mechanical chilling systems include a compressor, a coil and an expansion valve, and a refrigerant such as freon or ammonia to chill glycol which transfers the temperature through a jacketed container. All mechanical chilling systems are limited by the size of these components and to the efficiency of the refrigeration cycle. It is also known to use water circulated through the jacket and/or a shell, and a tube heat exchanger for heat transfer.

Mechanical chilling methods are limited in their chilling capacity and require longer periods of time to dissipate the heat load in the product. Such limitations include the following factors:

limited to the size and design of the mechanical system/unit, ie higher initial heat loads, with summer temperatures requiring more time to cool;
limited to a warmer chill temperature difference, ie sized to chill loads at between −20° F. (−29° C.) and −40° F. (−40° C.) (limited to capacity of the chilling system and the refrigerant);
large hot loads overwhelm the system and create increased chill time. The mechanical unit is a closed loop system with a design that absorbs a limited heat input and largely relies on conductive heat transfer through coils. When the heat load is first introduced, the system struggles to remove the heat. Over time, the refrigeration system will become more effective, but this takes a long period of time;
moisture from hot loads evaporates and condenses, then settles and coats the heat exchange coils, thereby greatly reducing chill/freeze efficiency and increasing process time; and
use of a hot defrost to eliminate the frost build up on the coil which therefore introduces additional heat and adds time/electrical costs to the process.

Historically, most injectors and nozzles/lances were constructed with materials such as stainless steel. These materials provide excellent conductive heat transfer through the metal surface to the product. This is, however, operationally undesirable as it is prone to blockage as the liquid product rapidly freezes and builds on the contact surface until frozen product blocks or dams the pipe flow or freezes the liquid into a block onto the lance surface. As a result, the industrial gas industry and the food industry have yet to develop a working sauce chilling method or associated apparatus.

Known mechanical chilling systems are therefore susceptible to processing deficiencies, and additional maintenance and cleaning with respect to condensation. The known systems require a considerable amount of maintenance and repair, which translates into increased oversight and operational support to run the conventional mechanical chilling system used for reducing the temperature of liquids, such as for example sauces, during food product processing.

BRIEF DESCRIPTION OF THE DRAWINGS

For a more complete understanding of the present embodiments, reference may be had to the following description taken in conjunction with the drawing Figures, of which.

DETAILED DESCRIPTION OF THE INVENTION

Figure 1:
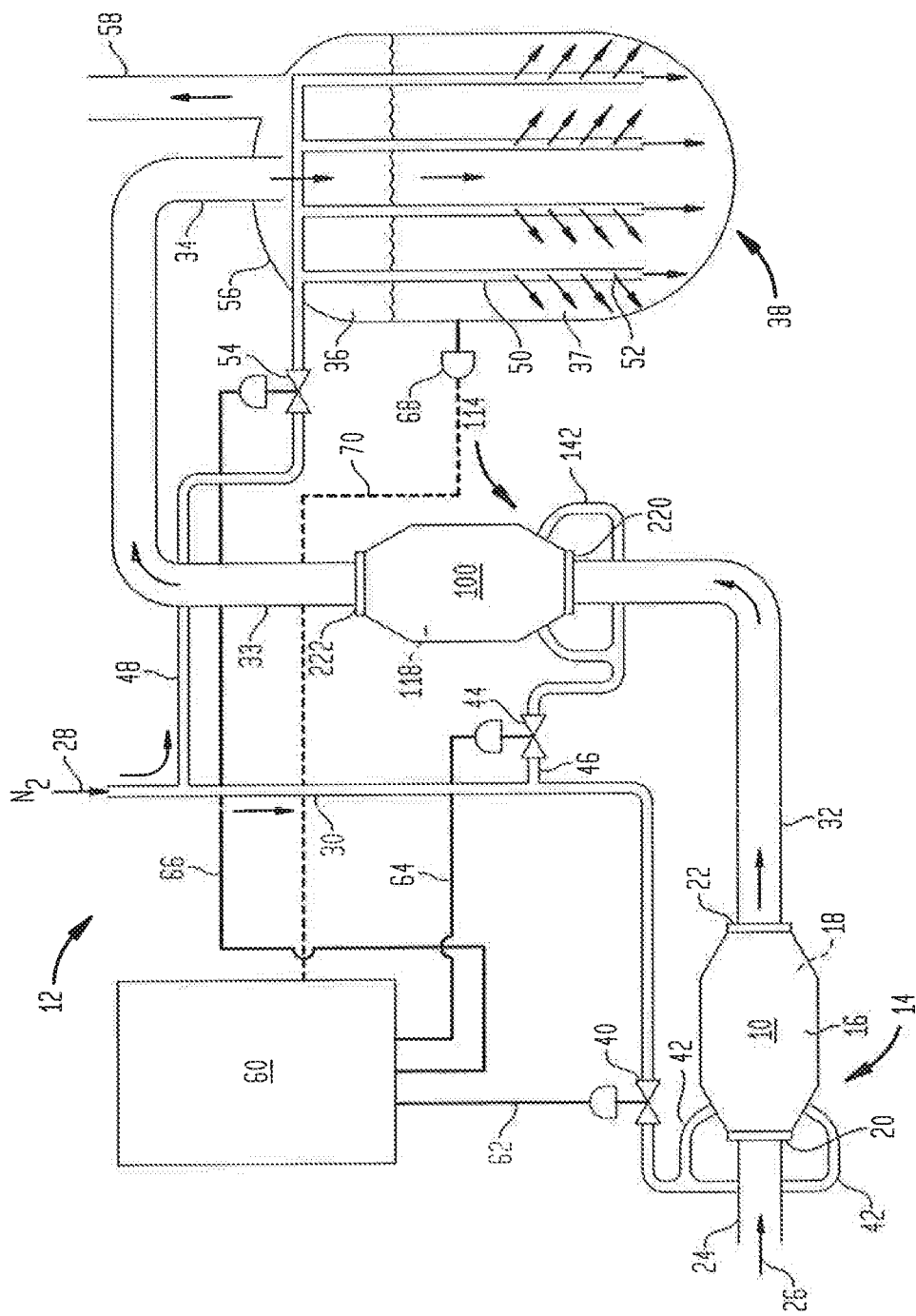
FIG. 1 shows an embodiment of an injector apparatus mounted in a system embodiment of the present invention.

The present embodiments use a cryogen to chill, for example, liquid comestibles such as for example sauces and marinates so that chilling time of the sauce is greatly reduced. The term "cryogen" means temperatures at −80° F. to −20° F. (−62° C. to −29° C.).

This injector apparatus is constructed of food grade material such as plastic for the specially configured injector, lances or nozzles used to inject the cryogen and mix directly with the liquid to be cooled or chilled. A wall or housing of the apparatus including the lances or nozzles for same may also be constructed from polymers sold under the trademark TEFLON® (TEFLON is a registered trademark of E.I. DuPont De Nemours & Co.). TEFLON or plastic (which may be referred to collectively herein as "plastic material") is an insulator greatly reducing the conductive heat transfer through the injector/nozzles/lances and avoiding plugging problems of same.

The advantages of the cryogenic sauce chilling methods of the present embodiments include providing:
higher production rates and quicker chill/cycle time;
lower unit chilling costs;
better chill flexibility/control to adapt to larger and/or hotter liquid loads (orders);
reduced down time and maintenance/replacement part costs;
a cost efficiency and an equipment foot print no greater than known systems to chill product to at least similar production quality and quantity;
improved product quality and lower bacteria counts with faster and more reliable freeze/chill; and reduction or elimination of hot defrost which lowers energy costs and provides faster chill cycle times for the liquid product.

The nitrogen ($N_2$) or carbon dioxide ($CO_2$) cryogen can be introduced in either a retro-fit or build into a new chilling system. There are several reasons for achieving a much faster chill, such as $N_2$ and $CO_2$ can be used at much colder set points of −109° F. to −321° F. (−78° C. to −196° C.), as opposed to −20° F. to −40° F. −29° C. to −40° C.) with a mechanical unit; and $N_2$ and $CO_2$ employ direct contact convective heat transfer which is a faster and more efficient heat transfer than conductive heat transfer employed by the known mechanical methods through heat exchangers.

In general, the nitrogen/$CO_2$ is an open or direct cooling system, and is injected directly into the liquid through the use of a specially designed food grade plastic material injector, lance or set of nozzles. Injection can be controlled with a temperature control loop which controls cryogen flow according to a preset set point. The unit can operate with either a modulating solenoid valve or an on/off solenoid valve, and it must be equipped with an exhaust, unlike the mechanical system which is a closed loop. The exhaust to the outside vents the spent or warm nitrogen/$CO_2$ gas which has picked up both heat and moisture from the product. This direct injection produces a convective interaction between the extremely cold liquid cryogen and the hot liquid or sauce which allows for a faster heat transfer at the product and exhausts moisture laiden warm gas. Rapid chill down is also achieved, because a large quantity of nitrogen/$CO_2$ can be introduced to pull heat from the product and it is not limited in chilling capacity. The cryogenic chilling system can easily be upgraded to provide more chilling capacity. A mechanical chilling system or a cold water heat transfer system are much more limited.

Referring in particular to FIG. 1, an in-line chill injector apparatus 10 is shown installed for use with an in-line sauce chilling system 12. It will be understood that more than one of the injector apparatus 10 can be installed and used with the system 12. It is also understood that although this description uses, by way of example only, a "sauce" to be chilled, other liquids or flowable products can be processed with the apparatus 10 in the system 12.

The injector apparatus 10 includes a housing 14 constructed of a plastic material sidewall 16 defining a chamber 18 within the housing. The housing 14 is also provided with an inlet 20 and an outlet 22, both of which are in fluid communication with the chamber 18.

A fluid to be chilled, such as for example a flowable food product such as a hot liquid sauce 26 or marinate, is introduced into the chilling system 12 by way of a pipe 24 which is sized and shaped to be received at the inlet 20 of the apparatus 10. The pipe 24 may be constructed of stainless steel. The sauce 26 flows through the pipe 24 and directly into the chamber 18 of the apparatus 10 where it is immediately subjected to a cryogenic substance of for example liquid nitrogen (LIN) or $CO_2$. Alternatively, gaseous nitrogen may also be provided by injection into the chamber 18. The LIN 28 originates from a remote source, such as for example a bulk storage tank (not shown) and is introduced into the system 12 and the apparatus 10 by way of a pipe 30. The pipe 30 may be constructed of stainless steel. The sauce 26 is therefore directly subjected to heat transfer by being in contact with the LIN 28 or other cryogen in the chamber 18.

The sauce 26 now chilled is exhausted from the chamber 18 through the outlet 22 and into another pipe 32 which can, in one embodiment, extend to a distal end opening 34 into an ullage space 36 of a kettle 38 or vessel for receipt of the chilled sauce. The pipe 32 may be constructed of stainless steel The ullage space 36 is present above a surface of chilled sauce 37 in the vessel 38.

In an alternative embodiment, another in-line injector apparatus 100 can be interposed in the pipe 32 downstream of the apparatus 10, and which includes similar elements and operates substantially the same as the apparatus 10. Use of the additional apparatus 100 in the system 12 is particularly well suited for when the incoming sauce 26 is at a temperature or volume justifying the need for a reduced temperature without compromising the chill down time of the system 12. In addition, the apparatus 100, now being able to absorb some of the heat transfer load, will permit the apparatus 10 to retain its original size and shape and not have to be of an unusually large volume because the apparatus 100 can absorb some of the heat transfer operation of the system 12. Moreover, having a plurality of the apparatus 10, 100 permits for flexibility in the system 12, so that one or both of the apparatus can be operated depending upon the type and/or amount of the sauce 26 or other liquid being introduced into the system 12. If the apparatus 100 is used, an outlet 222 would be in fluid communication with a pipe 33 also having the distal end 34 opening into the vessel 38. The pipe 33 may be constructed of stainless steel.

The pipe 30 through which the LIN 28 is introduced includes a solenoid valve 40 to control flow of the LIN from the pipe 30. Downstream of the valve 40 the pipe 30 branches to provide at least one nozzle 42 and for certain applications a plurality of the nozzles for introducing the LIN 28 into the chamber 18 of the housing 14. The nozzles 42 may also be constructed of Teflon or plastic, or alternatively may be of a metallic construction such as stainless steel or other alloy which is conducive with use of LIN. The LIN 28 is injected directly into the sauce 26 in the chamber 18 of the apparatus 10.

If the apparatus 100 is used in the system 12, another solenoid valve 44 is provided in a pipe branch 46 having one end in fluid communication with the pipe 30 to receive the LIN 28, and another end in fluid communication with one or more of the nozzles 142. The pipe 46 may be constructed of stainless steel. Similar to the apparatus 10, the injector apparatus 100 is fabricated from a plastic material, and the nozzles 142 may similarly be fabricated from a plastic material, or constructed of stainless steel or other alloy conducive to the use of LIN. Again, the LIN 28 is injected directly into the sauce 26 in the chamber 118 of the apparatus 110.

Another pipe branch 48 has one end in fluid communication with the pipe 30 to receive the LIN 28, and a distal end terminating in at least one and for certain applications a plurality of lances 50 disposed inside the vessel 38. The pipe branch 48 may be constructed of stainless steel. The lances 50 may also be constructed of plastic material, each of which having at least one and for most applications a plurality of outlets 52 or nozzles for injecting the chilled sauce into the vessel 38. The sauce in the vessel 38 is at approximately 59° F. (15° C.). Another solenoid valve 54 is provided in the pipe branch 48 to control flow of the LIN 28 to the lances 50.

The vessel 38 is provided with a lid 56 for access to an interior of the vessel, and an exhaust duct 58 in fluid communication with the ullage space 36 of the vessel.

A temperature control panel 60 is connected or wired to each one of the solenoid valves 40, 44, 54 as shown by connections 62, 64, 66, respectively. The control panel 60 is also in communication via wiring 70 with a temperature/level indicator 68 at the vessel 38.

The temperature control panel 60 can therefore receive a temperature and/or level signal input from the indicator 68 and thereafter transmit a signal to one or more of the solenoid valves 40, 44, 54 to adjust the amount of the LIN 28 being directed into the injector apparatus 10 or apparatus 10, 100, and to the lances 50.

The gas in the ullage space 36 of the vessel 38 occurs when the LIN 28 is exposed to the warmer atmosphere and boils off, even during its transfer through the pipe 33, so that gaseous nitrogen can be exhausted from the vessel for other uses and to reduce pressure within same.

Figure 2:
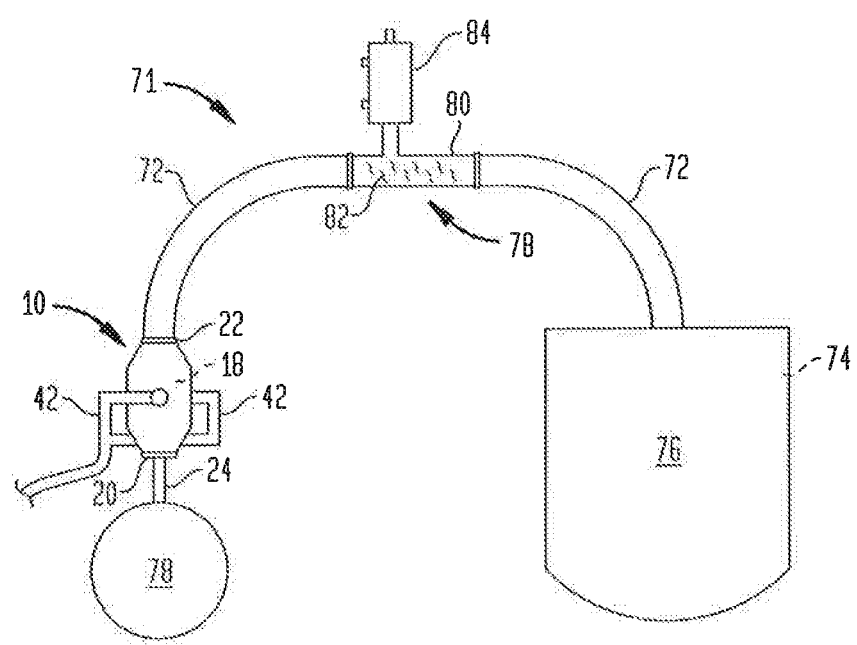
FIG. 2 shows an injector apparatus embodiment used in another system embodiment.

Referring to FIG. 2, a still further embodiment of an in-line chill injector system is shown generally at 71 for reducing the temperature of liquids or sauces being provided thereto. In this embodiment, the outlet 22 of the injector apparatus 10 is in fluid communication with an arcuate section of pipe 72 which can be fabricated from for example stainless steel. This arcuate pipe section 72 resembles a wide sweep elbow of piping which extends to and is in fluid communication with an interior 74 of a kettle 76 or vessel. The kettle 74 retains and can provide for further cooling of the sauce, marinade or fluid which has been moved by a pump 78 which originally provided the liquid to the injector apparatus 10.

Interposed in the pipe section 72 is a static mixer 78 section which is in fluid communication with the pipe section. The static mixer 78 includes an interior chamber 80 or space which may include therein twisted or irregular shaped metallic or plastic members 82 to create vortices and turbulence to further mix the liquid and cryogen transiting the pipe section 72.

A degassing or phase separator 84 is in fluid communication with the static mixer 78. As the liquid nitrogen vaporizes upon contact with the liquid to be chilled, the vapors can adversely impact the flow of the liquid through the pipe section. The degasser 84 reduces the effect of the LIN vaporization.

For many applications of the embodiment in FIG. 2, the static mixer 78 and the degassing separator 84 are mounted for use at the horizontal leg of the pipe section 72 as shown in this Figure.

Figure 3:
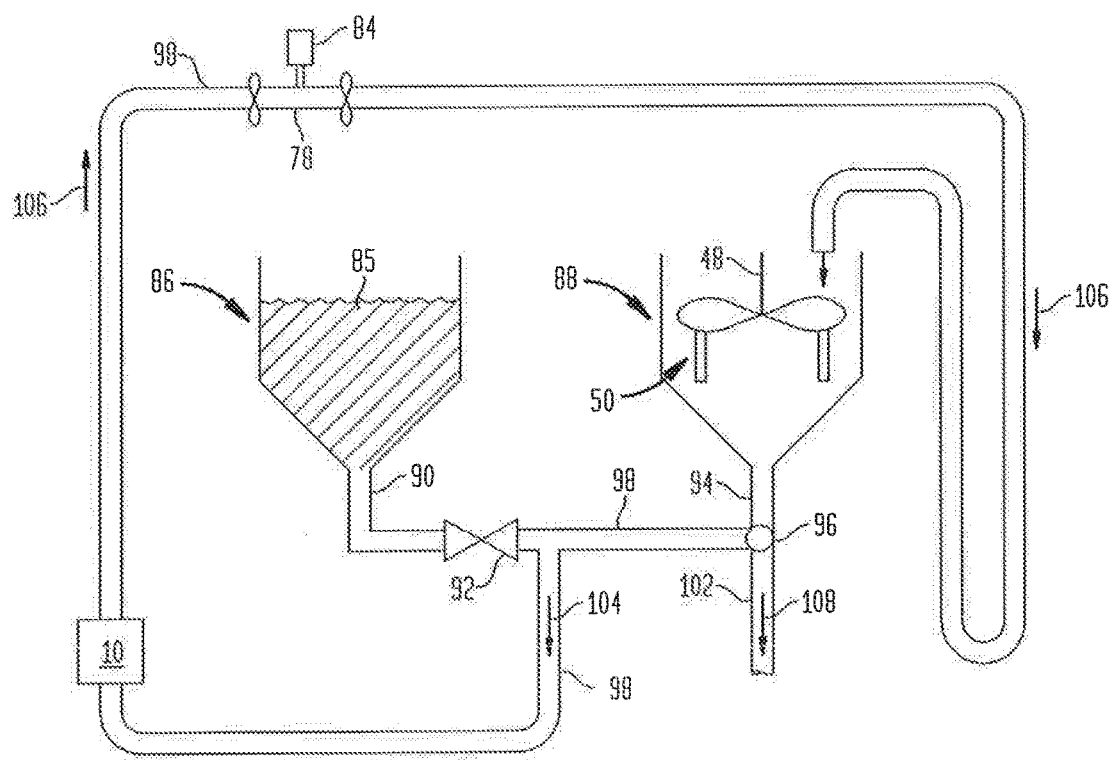
FIG. 3 shows another system embodiment according to the present invention.

Referring to FIG. 3, there is shown another system embodiment according to the present invention. An in-line chill injector apparatus 10 is arranged for coaction with a vessel 86 or kettle for heating a flowable food product 85 such as for example a sauce, and a vessel 88 or kettle for receiving and retaining the flowable food product which has been cooled or chilled. The heating vessel 86 includes an outlet in fluid communication with a pipe 90 having a valve 92 therein. The cooling or cool-down vessel 88 has an outlet in fluid communication with a pipe 94 having a valve 96 therein. A pipe 98 is in fluid communication with a downstream end of the valve 92 and a downstream end of the valve 96. In certain applications, the valve 96 may be a ball valve. Another pipe 102 is in fluid communication with the valve 96, and the pipe 102 can be connected to another apparatus (not shown) or for other processing downstream of the embodiment shown if FIG. 3.

The pipe 98 has interposed therein the in-line injector 10 for operation as follows. The heated flowable food product 85, such as for example a liquid marinate or sauce, is retained in the heating vessel 86 until such time as it must be released therefrom for subsequent cooling and processing. Thereupon, the valve 92 is opened permitting the sauce to pass from the pipe 90 and transit as shown by arrow 104 to the injector apparatus 10, The sauce passes into and through the apparatus 10 where it is directly and immediately mixed with the cryogen and thereafter directed as shown by arrow 106 to be discharged into the cooling vessel 88. The vessel 88 may be-similar in construction and operation to the kettle 48 shown in FIG. 1. That is, a cryogen such as LIN can be provided through the lances 50.

With the cooled flowable liquid food product now contained in the cooling vessel 88, at a certain point the vessel will become full or the liquid food product will be needed for subsequent processing. At such time, the valve 96 can be opened to release the cooled liquid food product through the pipe 102 as shown by the arrow 108 for subsequent use or processing. Alternatively, the valve 96 may be rotated (ball valve) and the liquid food product returned through the pipe 98 to the injector apparatus 10 for subsequent cool down and the cycle is repeated again until such time as the liquid food product is at a desired temperature in the vessel 88 for subsequent use or processing.

In certain embodiments of the apparatus, system and method described herein, the injector apparatus 10, 100 and the nozzles 42 are constructed of the same plastic material. In certain applications, the flowable food product 85 by way of example only is at a temperature of at least 35° F. (1.6° C.).

The embodiments of the present invention do not require the high capital costs associated with a mechanical chill system. More production of chilled product in an efficient manner translates into less overtime and higher productivity. More production equals lower unit costs. Flexibility of the system having the apparatus 10 (and 100) permits handling higher heat loads, and providing product quality control of temperature and bacteria. Faster pull down of the temperature improves quality of the product and increased production.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A system for treating a flowable food product, comprising:
   a container constructed from a material selected from the group consisting of TEFLON, plastic, and TEFLON and plastic;
   an injection chamber arranged within the container for receiving the flowable food product, the injection chamber including an inlet and an outlet in fluid communication with the injection chamber;
   at least one nozzle constructed from a material selected from the group consisting of TEFLON, plastic, and TEFLON and plastic, the at least one nozzle including a first end in fluid communication with a source of cryogen wherein the cryogen is a substance selected from the group consisting of a liquid nitrogen, gaseous nitrogen, liquid carbon dioxide, and gaseous carbon dioxide, each at a temperature in a range of from −20° F. to −321° F., and a second end in direct fluid communication with the injection chamber for providing the cryogen to the flowable food product in the injection chamber; and
   a mixer arranged in a pipe section downstream of and separate from the injection chamber, the mixer in fluid communication with the pipe section and the outlet of the injection chamber for providing turbulence to mix the cryogen and the flowable food product.

2. The system of claim 1, wherein the mixer comprises a shaped member disposed therein to facilitate turbulence of the cryogen and the flowable food product.

3. The system of claim 1, further comprising a degasser in fluid communication with the mixer for removal of cryogen vapor from said mixer.

4. The system of claim 1, further comprising:
a first vessel for containing the flowable food product;
a second vessel for containing cool-down flowable food product; and
piping interconnecting the first vessel, the second vessel and the injection chamber of the container for the flowable food product and the cool-down flowable food product to be received in said injection chamber.

5. The system of claim 4, further comprising a pipe having a first end in fluid communication with a downstream outlet of the mixer, and a second end in fluid communication with the second vessel.

6. The system of claim 5, further comprising another cryogen delivery apparatus in fluid communication with the second vessel.

7. The system of claim 1, wherein the material for the container further comprises stainless steel.

* * * * *